United States Patent

[11] 3,591,026

| [72] | Inventor | Eugene F. Felstehausen<br>Hoopeston, Ill. 60942 |
|---|---|---|
| [21] | Appl. No. | 822,628 |
| [22] | Filed | May 7, 1969 |
| [45] | Patented | July 6, 1971<br>Continuation-in-part of application Ser. No. 602,062, Dec. 15, 1966, now Patent No. 3,460,191. |

[54] FOOD MOLDING PROCESS
1 Claim, 5 Drawing Figs.

[52] U.S. Cl. ............................................. 214/152,
17/32, 214/1 BC
[51] Int. Cl. ............................................. B65g 31/04
[50] Field of Search ............................................. 198/178;
221/213—215; 294/61; 17/32; 214/1 BC, 152

[56] References Cited
UNITED STATES PATENTS

| 1,043,168 | 11/1912 | Stiles | 294/61 X |
|---|---|---|---|
| 1,099,409 | 6/1914 | Vandiver | 221/214 |
| 1,436,291 | 11/1922 | Rine | 294/61 X |
| 1,709,788 | 4/1929 | Greene | 198/178 |
| 2,500,647 | 3/1950 | Schulthess | 294/61 |
| 2,738,215 | 3/1956 | Thompson | 294/61 |
| 3,173,553 | 3/1965 | Weien | 198/178 X |

Primary Examiner—Evon C. Blunk
Assistant Examiner—W. Scott Carson
Attorneys—Francis W. Anderson and C. E. Tripp ABSTRACT: A method of transferring patties in a hamburger patty-forming machine having turret-mounted pickup blade - units and a unitary stripper, comprising lowering the blade unit at the mold to impale a hamburger, raising the blade unit and indexing it to a discharge conveyor, camming up the stripper unit and spring lowering it between a fixed upper position and fixed lower position with the stripper unit at its lowered position clearing the impaled product at the pickup station but applying a downward acceleration to the impaled product at the discharge conveyor that exceeds the acceleration of gravity and cleanly separates the product from the stripper unit.

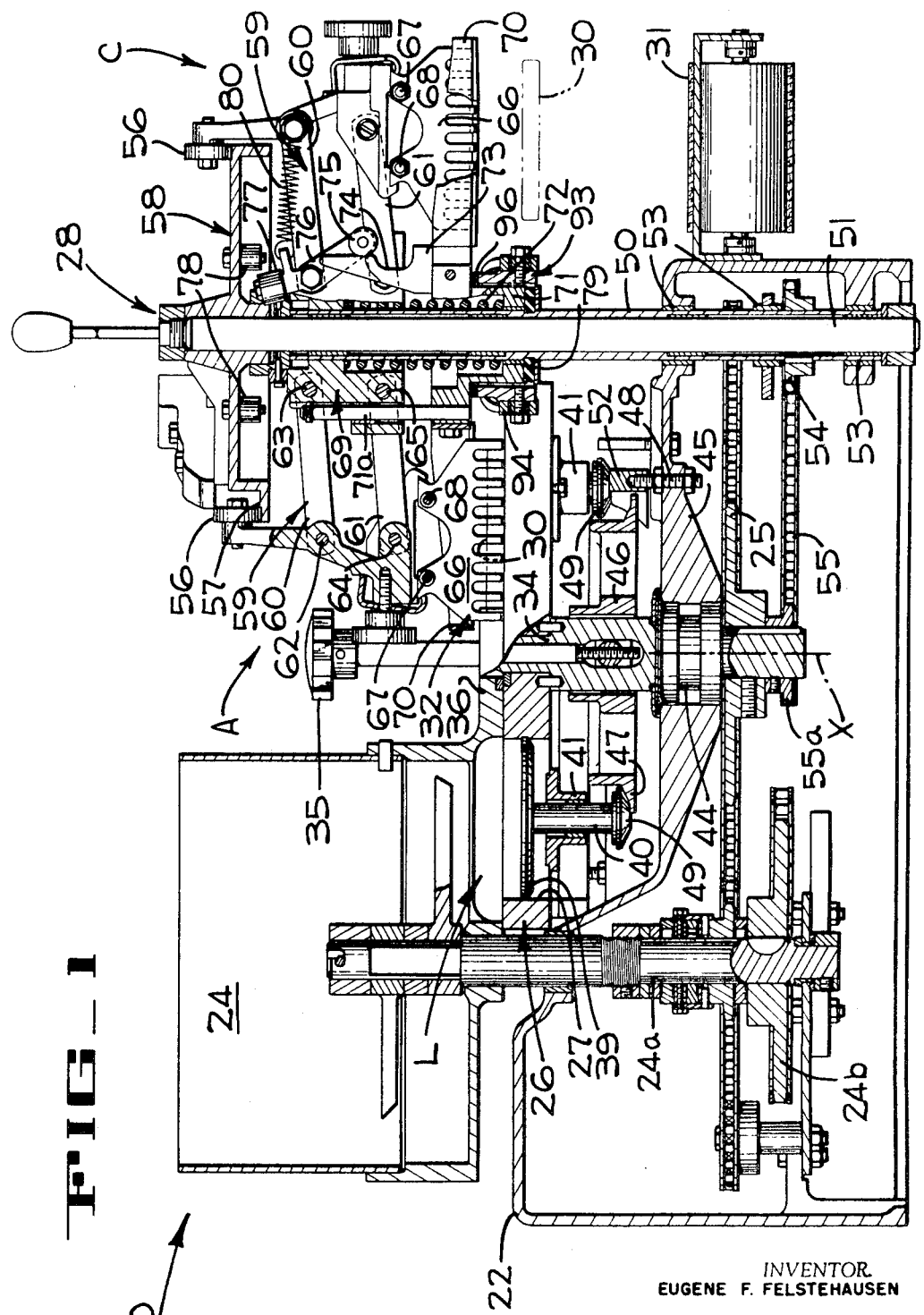
FIG_1
INVENTOR.
EUGENE F. FELSTEHAUSEN
BY J.W. Anderson
C.E. Tripp
ATTORNEYS

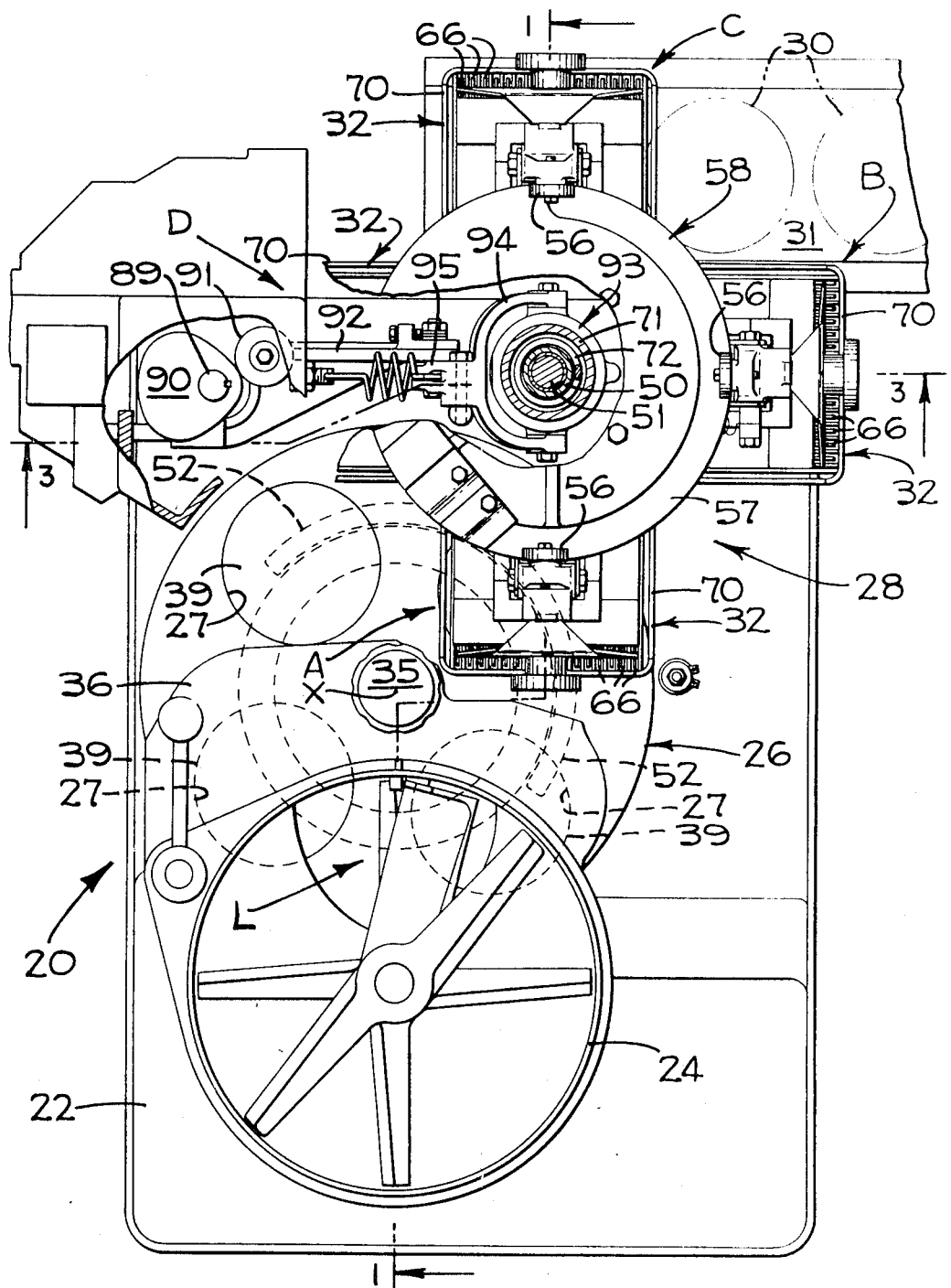
FIG_2

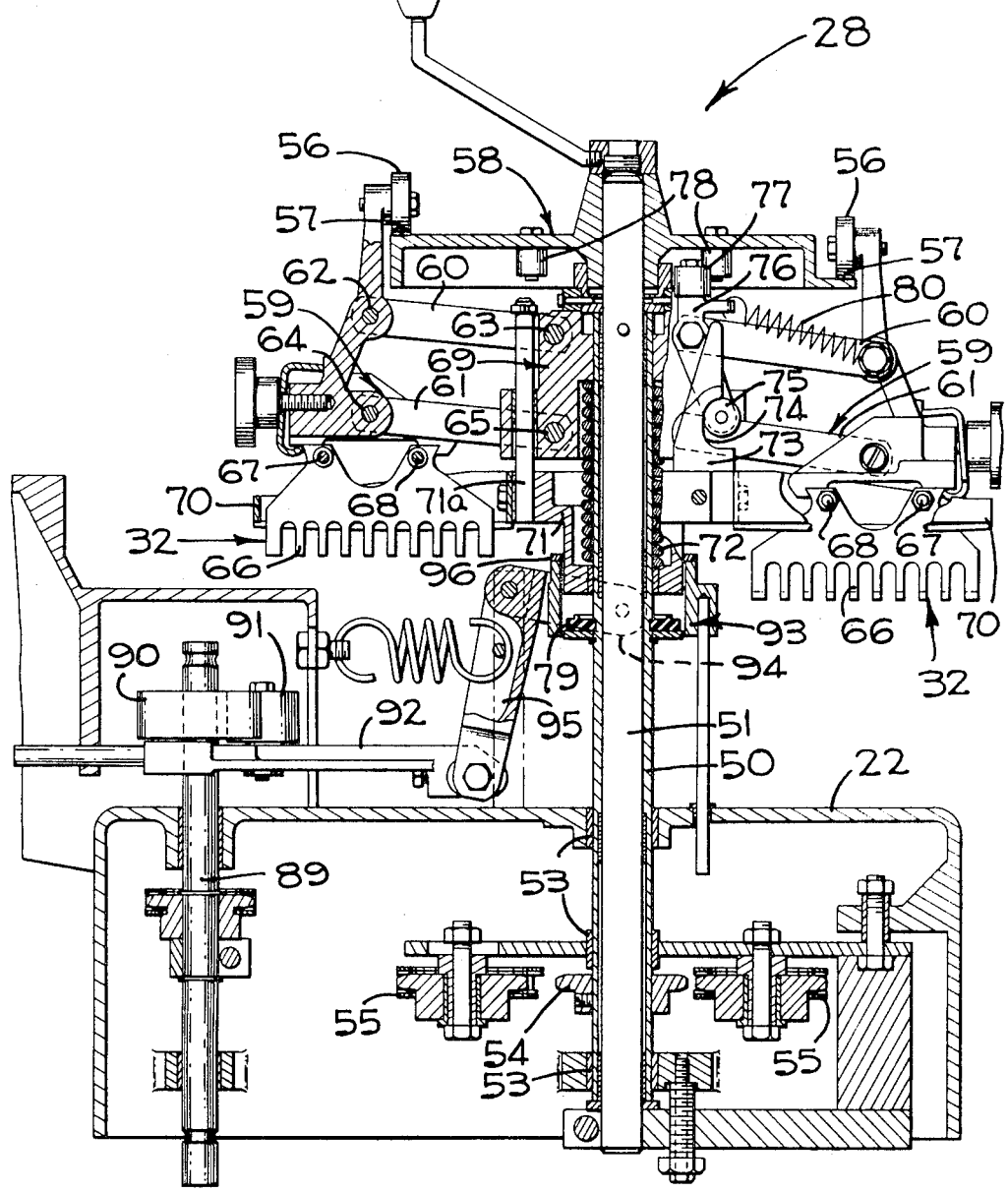

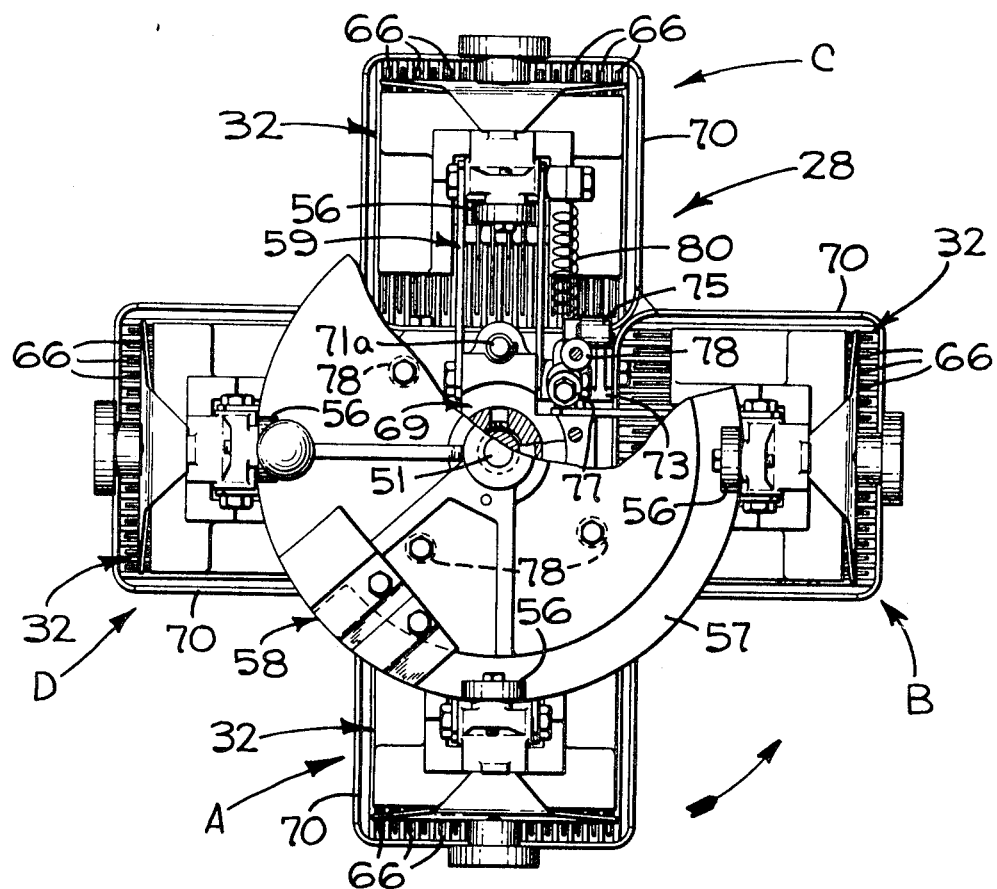
FIG_4
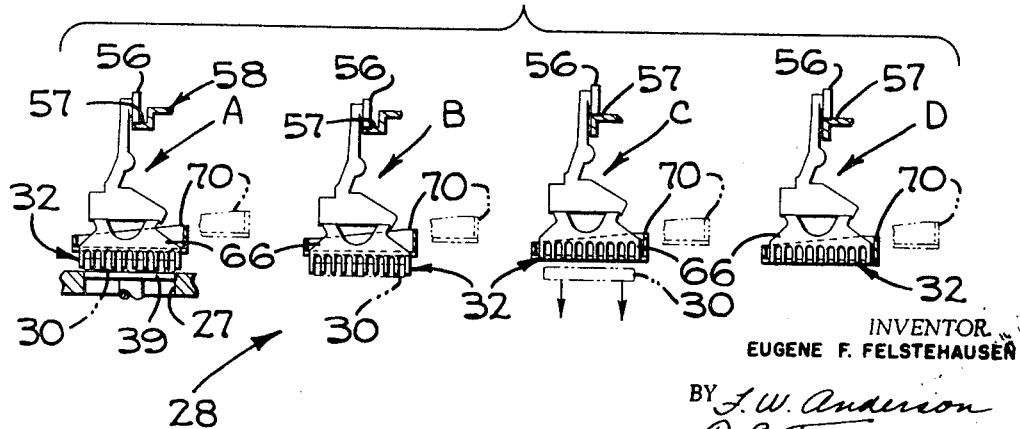
FIG_5

3,591,026

1

FOOD MOLDING PROCESS

CROSS REFERENCE TO RELATED APPLICATIONS

This application is a division of my copending U.S. application Ser. No. 602,062 for Food Molding Machine, filed Dec. 15, 1966, now U.S. Pat. No. 3,460,191.

A food-molding machine for forming ground meat into patties of predetermined shape and weight is described in my U.S. Pat. No. 3,372,650, dated Apr. 16, 1968 and assigned to FMC Corporation, San Jose, California a common assignee.

BACKGROUND OF THE INVENTION

Discharging formed meat patties from a food-molding machine has been a problem as there is a tendency for the formed meat patty to adhere to the means used for discharging the patty.

In the food-molding machine described herein, a plurality of pickup heads are provided with coacting grill members wherein the formed meat patty is in effect stripped from the pickup head by movement of the grill member and discharged onto a conveyor or the like.

The stripping action of the grill member is occasioned by the sudden release of the spring loaded grill member that causes a rapid acceleration of the grill member wherein the patty is carried along with the grill member until the grill member comes to an abrupt stop, with the patty continuing to move on by reason of inertia. It is this acceleration and sudden stop that causes the patty to leave the grill member cleanly and efficiently without adherence of particles of the patty remaining on the grill member.

Basically, the process of the present invention is carried out in a food-molding machine which comprises a hopper for supplying the ground meat to turret pockets where the meat patties are formed. A plurality of pickheads are provided for impaling the patties and moving the formed meat patties from the turret pockets to a discharge conveyor. A stripping grill coacts in relation with each of said pickheads to remove the patties from the pickhead when a predetermined pickhead is in discharge position relative to a conveyor or the like.

It has been found that there is a tendency for the meat patties to adhere to a stripping grill thereby making it difficult to efficiently discharge the patties to a conveyor or the like. In other words, it has been found that it is not entirely satisfactory to merely strip a patty from a pickhead as a means of discharging or dispensing a patty from the machine.

In the process of the present invention I rapidly move the stripping grill down in relation to the impaling pickhead so as to literally throw the patty from the pickhead and I then abruptly stop the stripping grill. Such abrupt stopping action of the stripping grill causes the entire patty to leave the grill cleanly and completely. Such action of the stripping grill might be said to utilize the principle of inertia in that both the grill and patty are accelerating downwardly at a rapid rate, and then abruptly the grill is stopped, leaving the patty free to continue its movement—and any and all particles of meat are inclined to travel away from the grill leaving it clean and ready for further patty dispensing.

It is therefore an object of the invention to provide an efficient and improved discharge of meat patties from a food-molding machine.

It is another object of this invention to provide an improved process for cleanly delivering meat patties from a stripping grill.

It is another object of this invention to provide an improved means for discharging a meat patty that relies primarily on rapid motion in one direction and whereby said motion is abruptly retarded to allow the meat patty to continue freely in said one direction thereby cleanly leaving said means for discharging a patty.

These and other objects and advantages of the invention will become apparent from the following description, and drawings, wherein:

2

FIG. 1 is an elevation view in section of the food-molding machine of the present invention, the section being taken along line 1-1 of FIG. 2;

FIG. 2 is a plan view, partly broken away, of the machine of FIG. 1;

FIG. 3 is a vertical section taken along line 3-3 of FIG. 2;

FIG. 4 is a plan view of a portion of the machine of FIG. 1; and

FIG. 5 is a series of four operational views taken at successive stations A, B, C and D of the machine and showing the operational position of a particular pickhead at the four stations A—D, which are indicated on FIG. 4.

Referring now to FIG. 1, wherein a food-molding machine 20 includes a base 22 supporting a feed hopper 24, a pocket turret 26, and a transfer turret 28. Ground meat is placed in the feed hopper 24 and discharged into pockets 27 of the pocket turret 26. As the pocket turret 26 is revolved as by sprocket 25 and shaft 34, filled pockets 27 are positioned sequentially under the transfer turret 28. Carried by the transfer turret 28 in a counterclockwise direction as viewed in FIG. 4, are four equally spaced pickheads 32 which at A (FIG. 2) successively impale a molded ground meat patty 30 and carry and discharge the patties at a discharge zone "C" in a substantially vertical path toward a conveyor 31 as the pickheads 32 are continuously rotated.

The pocket turret 26 is mounted on a drive shaft 34 and secured thereto for rotation therewith. The drive shaft has an end cap 35 connected to the drive shaft which is positioned above the base member 36. The turret 26 has a plurality of cylindrical bores or pockets 27 angularly spaced about axis X. A cylindrical piston 39, having a connecting rod 40, is slidably received in each bore 27. The connecting rod 40 extends through a bearing 41.

A cylindrical standard 44, is mounted in a base member 45 in axis X. Standard 44 rotatably receives the drive shaft 34 which extends therethrough. A sleeve 46 is slidably received over the shaft 34. The sleeve 46 has a radially extending flange 47 which defines a cam track. A fastener 48, connected to the base member 45 and cam track 52 (FIGS. 1 and 2). A head 49, which is connected to the end of each connecting rod 40, defines a cam follower which rides on the cam track defined by flange 47 and on cam track 52. Each connecting rod by gravity urges the cam follower 49 into engagement with cam tracks 47 and 52. The bores 27 define pockets with a movable bottom wall, formed by the pistons 39. As the pocket turret 26 is rotated, the pistons 39 are positioned in respective pockets 27 by the cam tracks 47 and 52.

Ground meat is deposited in the pockets 27 and the loading station indicated at L as the turret 26 revolves, each pocket receiving meat up to the level of the top of turret 26. The thickness of the meat patty formed in each pocket will depend on the level of the piston 39 at the time the meat is deposited in the pocket.

It will be noted that the sleeve 46 is movable on the standard 44 in a direction parallel to the direction of movement of the pistons, and that the sleeve is in operating engagement (through head 49 and connecting rods 40) with the pistons. Therefore, the level of the piston 39 is determined by the axial position of the sleeve 46.

It will be noted that the cam track 52 is positioned under the pickup station and, as the turret 26 swings a pocket 27 into the pickup station, the cam follower rides up the cam track 52 to raise the piston 39 and the meat patty so that it can be picked up by a pickup head 32 at station "A."

Referring now to FIGS. 1 and 3 the transfer turret 28 with pickup heads 32 is mounted for rotation on a sleeve 50 coaxial with shaft 51 and mounted in bearings 53. The sleeve 50 is driven as by sprocket 54 through a drive chain 55 that is trained around a sprocket 55a keyed to shaft 34. Shaft 34 is, in turn, driven by a chain and sprocket mechanism from a shaft 24a that is driven through sprocket 24b by an electric motor (not shown). The transfer turret 28 includes four pickup heads 32 that are raised and lowered by the action of cam followers 56 riding along a cam track 57 of stationary cam head 58.

Interconnecting each cam follower 56 to the associated pickup head 32 is a parallelogram linkage system 59 comprising links 60 and 61 pivotally mounted as at 62, 63, 64 and 65. Pick up blades 66, integral with the pickup heads 32 are attached as at 67 and 68 and are provided with a plurality of fingers. It can be seen that as sleeve 50 is rotated, a hub 69, that is keyed to sleeve 50 and carries the parallelogram linkages, is rotated therewith to rotate the pickup heads and the cam followers 56 along the cam track 57. As each pick up head 32 is superadjacent the station A, a piston 39 in the turret 26 raises a patty out of the pocket in which it was formed. The pick blades are then lowered to impale the meat patty 30 which adheres to said blades 66 as the blades are positioned by the cam follower 56 and linkage 59 and the patty is carried by the pickup blades as the transfer turret 28 rotates, to position C superadjacent the conveyor 31. Each of the four sets of blades 66 is associated with a grill member 70 that is secured to a collar member 71 which is coaxial with said sleeve 50 and is rotated therewith by means of pins 71a that are secured to member 71 and are slidably engaged in holes in the hub 69. A spring means 72 located between the collar member 71 and member 69 urges the four grill members 70 in a downward direction. However, four times during a single rotation of the collar 71, the collar is raised against the downward bias of spring 72, latched in the raised position, and then released. The collar 71 and the four grill members 70 are held against the downward urging of the spring in a raised position by a locking member 73 (FIG. 3) secured to collar 71 and provided with a recess 74 that engages a pin 75 mounted in a bellcrank 76 which is pivoted on hub 69. The opposite end of the bellcrank 76 is provided with a roller 77 which is adapted to successively engage four rollers 78 mounted on the stationary cam head 58. The bellcrank 76 is tripped out of engagement with pin 75 when a roller 78 is contacted by roller 77 during rotation of turret 28 so that the spring 72 urges the grill member 70 downwardly in a rapid manner to strip the meat patty at station C from the pickup blades 66. In effect the rapid spring action of the grill member 70 literally throws the meat patty downwardly onto the conveyor 31 as the grill member 70 comes to an abrupt stop as collar member 71 engages stop means 79. As will be explained presently, only the meat patty at station C has been raised to a position at this time such that downward movement of the grill will be effective to strip the patty from the blades.

For moving the locking member 73 into locking position after discharge, a spring 80 urges the roller 77 and bellcrank 76 into locking position to receive pin 75 in recess 74 of locking member 73 during the next upward movement of the member 73. The collar 71 and the attached grill members 70 are raised four times during each revolution of shaft 50 by means of a yoke 94 (FIG. 3) that has arms that extend to opposite sides of and are pivotally connected to a lift sleeve 93. A cam 90, keyed to a shaft 89, engages a follower roller 91 carried on a link 92 that is pivoted to a lever 95 on which the yoke 94 is integrally formed. A nylon washer 96 is supported on the upper edge of lift sleeve 93 to engage the undersurface of the rotating central collar 71.

In operation, the rotation of the transfer turret 28 and grill member 70 is such that a ground meat patty is caused to be picked up at station A and the patty 30 is discharged at station C.

It should be noted that the grill member 70 is spring actuated downwardly each time roller 77 strikes one of the rollers 78, but a patty is stripped from pickhead 32 only at station C. In FIG. 1 it is noted that the pickhead 32 is in an extreme downward position so that the downward travel extent of grill member 70 does not interfere with the patty pick up at station A. The cam follower 56 is on the lower part of the cam track 57 at station A and continues on the lower part through station B. The cam follower 56 then travels to the upper cam track at station C and remains there until it passes station D. Thus, the grill member 70 does not interfere with the hamburger patty on the blades 66 until the pickhead 32 is at station C and the cam follower is on the upper cam track, and at that station the grill member actuation strips the patty from the pickhead.

Referring now to FIGS. 4 and 5 the pickhead 32 and associated grill member 70 is shown rotating in a counter-clockwise direction. As the rotation of the transfer turret 28 is continuous, it might be said that FIG. 4 represents stop action with the pickhead 32 in a pickup and discharge position. By arbitrarily designating stations A, B, C and D as positions at which certain actions occur we see in FIG. 5 that station A is representative of the pickup station with the blades 66 fully extended by the position of cam follower on the lower part of the cam track 57. The instantaneous relative positions of the blades 66 and the stripper plate 70 at station B is the same as at station A. In the third view from the left, station C, the blades 66 will have been raised (along with the grill member 70) but the grill member 70 is shown in its lowest position because the grill member has been snapped downwardly by the spring 72 (FIG. 1) after contact between roller 77 and roller 78 to discharge a patty 30. As described previously, the blades 66 are raised to their uppermost position by action of cam follower 56 on the upper part of the cam track 57, (FIG. 1) and the grill member 70 has been spring urged downwardly to strip the patty 30 off the blades 66 and the member 70 has come to an abrupt stop while the patty 30 continues in a path indicated by the arrow, to the conveyor 31, leaving the grill member 70 freely and cleanly. Station D shows the raised blades and the lowered grill member before returning to station A, at which time the blades are relowered by the cam track 57, leaving the grill cocked in its upper position as previously explained.

I claim:

1. A method for transferring molded food products from a pickup station to a discharge device by employing a plurality of independently reciprocating pickup blade units and a unitary stripper unit for all blade units and wherein each blade unit is lowered at the pickup station for impaling the molded food product, and each blade unit and the impaled products are shifted from the pickup station to a position above the discharge device, said method comprising synchronously raising and lowering the stripper unit between a fixed upper position and a fixed lower position with the stripper unit at its lower position clearing the impaled food product on the lowered blade unit at the pickup station while simultaneously applying a downward acceleration to the product impaled on the raised blade unit at the discharge device, said acceleration exceeding the acceleration of gravity for quickly freeing the product from impalement, and suddenly terminating lowering of the stripper unit for cleanly separating the product from the stripper unit. axes of said supporting means with respect to said housing means and said piston means around said axis of operation in said second direction opposite to said first direction in said manner such as to effect cyclic contraction and expansion of said chamber spaces.

PO-1050
(5/69)

UNITED STATES PATENT OFFICE
CERTIFICATE OF CORRECTION

Patent No. 3,591,026      Dated July 6, 1971

Inventor(s) Eugene F. Felstehausen

It is certified that error appears in the above-identified patent and that said Letters Patent are hereby corrected as shown below:

Front page, first column, line 6, delete "Continuation-in-part" and insert --Division--; line 9, insert --/73/ Assignee FMC Corporation--; line 10, insert --San Jose, California--.

Signed and sealed this 13th day of June 1972.

(SEAL)
Attest:

EDWARD M. FLETCHER, JR.
Attesting Officer

ROBERT GOTTSCHALK
Commissioner of Patents